United States Patent
Park

(10) Patent No.: US 6,208,476 B1
(45) Date of Patent: Mar. 27, 2001

(54) DATA RECORDING DEVICE AND METHOD FOR RECORDING DATA ON A MAGNETIC TAPE WITH ERROR CORRECTION

(75) Inventor: Pan-Ki Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/351,045

(22) Filed: Nov. 28, 1994

Related U.S. Application Data

(63) Continuation of application No. 07/814,617, filed on Dec. 30, 1991, now abandoned.

(30) Foreign Application Priority Data

Jan. 22, 1991 (KR) ...................................................... 91-1020

(51) Int. Cl.$^7$ ................................ G11B 27/36; G11B 5/09
(52) U.S. Cl. ................................................. 360/31; 360/53
(58) Field of Search ................................. 360/53, 51, 39, 360/13, 32, 33.1, 31; 371/13; 382/240

(56) References Cited

U.S. PATENT DOCUMENTS

| | | | |
|---|---|---|---|
| 3,863,228 | * | 1/1975 | Taylor ................................... 360/53 X |
| 4,413,289 | * | 11/1983 | Weaver et al. ........................... 360/51 |
| 4,415,938 | * | 11/1983 | Heitmann ................................. 360/53 |
| 4,707,805 | * | 11/1987 | Narusawa et al. ................... 360/32 X |
| 4,780,772 | * | 10/1988 | Shibuya et al. ........................... 360/51 |
| 4,860,271 | * | 8/1989 | Yokogawa et al. ................. 369/44.25 |
| 4,876,616 | * | 10/1989 | Katsumata et al. ..................... 360/53 |
| 5,055,939 | * | 10/1991 | Karamon et al. ................... 360/13 X |
| 5,267,100 | * | 11/1993 | Ichijo et al. ............................ 360/53 |

OTHER PUBLICATIONS

Dictionary of Computers, Information Processing, and Telecommunications, 2nd Ed., Jerry M. Rosenberg, John Wiley & Sons, NY, ©1984, 1987 pp. 66–67.*

* cited by examiner

*Primary Examiner*—W. Chris Kim
(74) *Attorney, Agent, or Firm*—Robert E. Bushnell, Esq.

(57) ABSTRACT

A data recording device for recording data on a magnetic tape by means of a rotational head. A buffer memory buffers the data received through input/output unit, and a controller controls the data recording device to recording and reproduce data on and from the magnetic tape. A digital signal processor (DSP) converts the data from the buffer memory into a digital audio tape recorder (DAT) format, and a memory stores the converted data from the DSP to compare with the data recorded on the magnetic tape. A recording amplifier amplifies the converted data from the DSP and delivers the amplified converted data to the rotational head to record on the magnetic tape, and a reproduction amplifier amplifies the data reproduced from the magnetic tape by the rotational head. A data strobe circuit puts the data from the reproduction amplifier into input codes so as to generate distinction reproduction signals and clock signals, and first and second buffers receiving the distinction reproduction signal from the data strobe circuit are switched according to record/reproduction mode of the controller. A comparing unit compares the distinction reproduction signal received from the first buffer and the data stored in the memory according to a control signal from the controller so as to detect errors in the data from the I/O unit recorded on the magnetic tape.

29 Claims, 3 Drawing Sheets

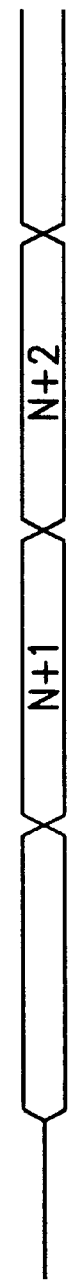
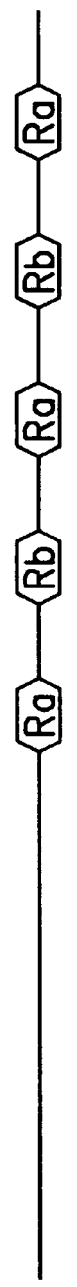
FIG. 4A
FIG. 4B
FIG. 4C
FIG. 4D
FIG. 4E
FIG. 4F
FIG. 4G
FIG. 4H

DATA RECORDING DEVICE AND METHOD FOR RECORDING DATA ON A MAGNETIC TAPE WITH ERROR CORRECTION

This is a continuation of application Ser. No. 07/814,617 filed Dec. 30, 1991, abandoned.

TECHNICAL BACKGROUND

The present invention relates to a data recording device of a digital audio tape recorder (DAT) and method therefor, and more particularly to a data record device and method for recording data on a magnetic tape by means of a rotational head without error.

Generally the importance of the data recorded in a DAT-DS (Digital Tape Recorder-Data Storage) compares to that of computer data. Hence, the data containing any errors in the magnetic tape poses a serious problems.

In a conventional DAT, the data delivered from an external system is converted into a DAT format, simply recorded on the magnetic tape by means of a rotational head. Therefore there is no means for detecting whether important data, (e.g., computer data,) except audio data, is correctly recorded on the magnetic tape.

SUMMARY OF THE INVENTION

It is an object of the present invention to provide a data recording device and method for recording data on a magnetic tape without errors in a DAT.

According to one aspect of the present invention, the recorded data is immediately reproduced to correct possible errors contained in the recorded data.

According to an aspect of the present invention, a data recording device records data on a magnetic tape by means of a rotational head. A buffer memory buffers the data received through an input/output unit, and a controller generates a control signal for controlling the data record device to recording and reproduce data on and from the magnetic tape. A digital signal processor (DSP) converts the data from the buffer memory into a digital audio tape recorder (DAT) format, and a memory stores the converted data from the DSP to compare with the data recorded on the magnetic tape. A recording amplifier amplifies the converted data from the DSP and delivers the amplified data to the rotational head to be recorded on the magnetic tape, and a reproduction amplifier amplifies the data reproduced from the magnetic tape by the rotational head. A data strobe circuit converts the data from the reproduction amplifier into input codes so as to generate distinction reproduction signals and clock signals, and first and second buffers receiving the distinction reproduction signal from the data strobe circuit are switched according to a record/reproduction mode of the controller. A comparing unit compares the distinction reproduction signal received from the first buffer and the data stored in the memory according to a control signal from the controller so as to detect errors in the data from the I/O unit recorded on the magnetic tape.

BRIEF DESCRIPTION OF THE ATTACHED DRAWINGS

For a better understanding of the invention and to show how the same may be carried into effect, reference will now be made, by way of example, to the accompanying diagrammatic drawings, in which:

FIGS. 4A to 4H are timing diagrams for illustrating the operation of FIG. 1.

DETAILED DESCRIPTION OF A PREFERRED EMBODIMENT

Figure 1:
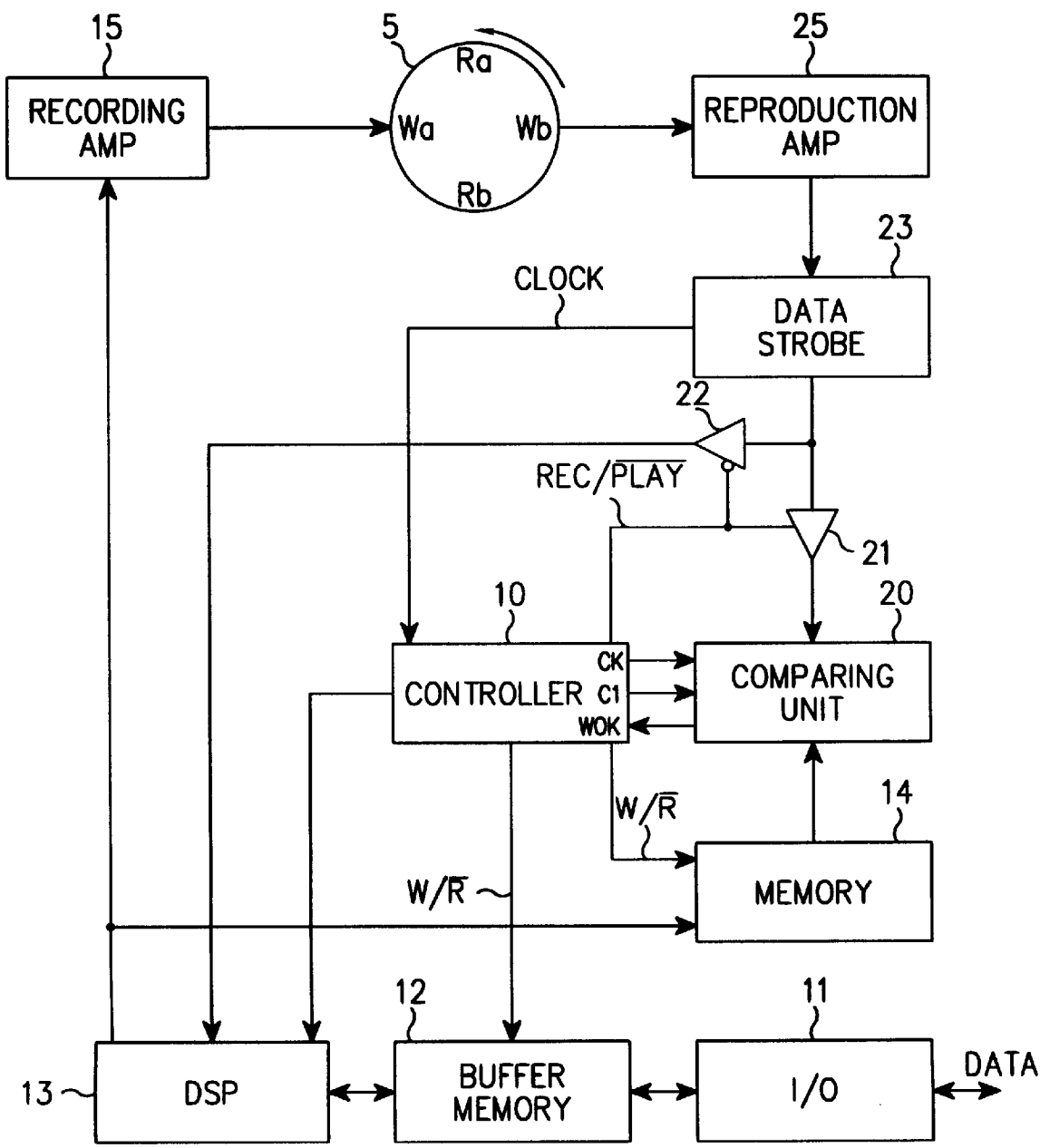
FIG. 1 is a block diagram for illustrating a data recording device according to the present invention.

Referring to FIG. 1, a buffer memory 12 buffers the data received through input/output unit 11. A controller 10 is to generate a control signal to control the data recording device to record and reproduce data on and from the magnetic tape.

A digital signal processor (DSP) converts the data from the buffer memory 12 into a digital audio tape recorder (DAT) format. A memory 14 stores the converted data from the DSP 13 for a comparison with the data recorded on the magnetic tape. A recording amplifier 15 amplifies the converted data from the DSP 13 and delivers the amplified inverted data to the rotational head 5 for recordation on the magnetic tape.

A reproduction amplifier 25 amplifies the data extracted from the magnetic tape by the rotational head 5. A data strobe circuit 23 puts the data from the reproduction amplifier 25 into input codes to generate distinction reproduction signals and clock signals. First and second buffers 21 and 22 receive the distinction reproduction signal from the data strobe circuit 23. The first and second buffers are switched according to a record/reproduction mode of the controller 10.

A comparing unit 20 compares the distinction reproduction signal received from the first buffer 21 and the data stored in the memory 14 according to a control signal from the controller 10 in order to detect errors in the data from the I/O unit 11 recorded on the magnetic tape.

Figure 2:
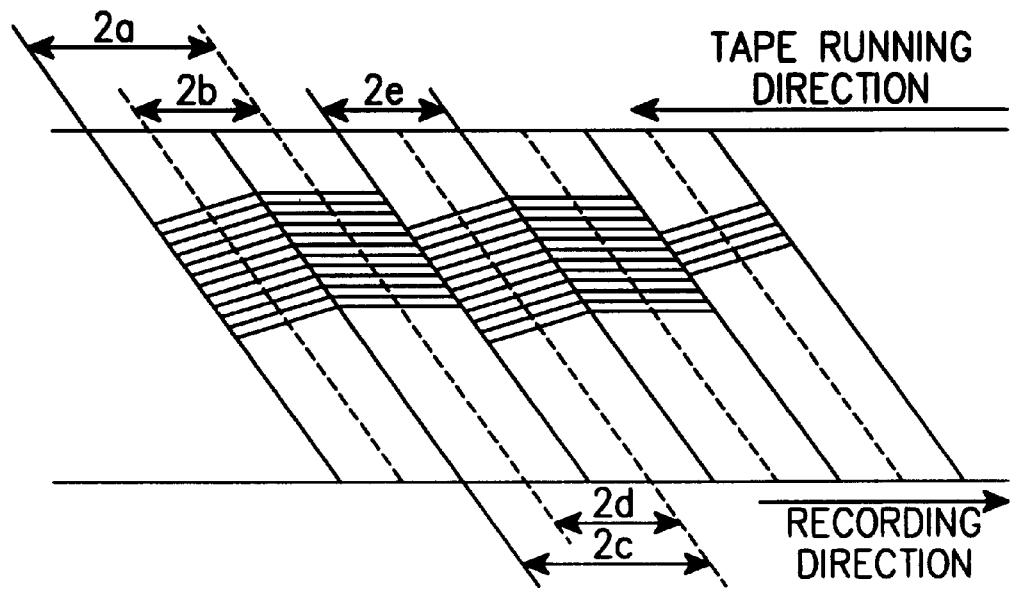
FIG. 2 is a schematic diagram for illustrating the tracks of a rotational head on a magnetic tape.

In FIG. 2, 2a indicates the recording region of the recording head Wa of the rotational head 5, 2b the substantial reproduced region of the reproduction head Ra, 2c the recording region of the recording head Wb, 2d the substantial reproduced region of the reproduction head Rb, and 2e the track pitch of the rotational head.

The comparing unit 20 has a first latch circuit 20a for latching the clock signals CK from the controller 10 and the distinction reproduction signals from the first buffer 21 in order to compare with the data stored in the memory 14, a comparator 20b for comparing the output data of the first latch circuit 20a and the stored data of the memory 14 in order to detect data recording errors, and a second latch circuit 20c for receiving the output of the comparator 20b to latch write data WOK indicating whether errors exist, the write data being delivered to the controller 10.

In operation, as soon as the recording heads Wa and Wb of the rotational head 5 record data on a magnetic tape, the reproduction heads Ra and Rb reproduce the recorded data, and then a comparison is made to detect errors. The data containing the errors is corrected.

The data received from an external system such as a computer through the I/O unit 11 is recorded on a magnetic tape of the DAT. In this case, the data is stored into the buffer memory 12 according to a control signal of the controller 10 when the speed for recording the data on the magnetic tape is slower than the speed for the external system to transmit the data. Namely, the buffer memory 12 matches the data recording speed of the head with the data transmission speed of the external system.

The DSP 13 converts the data from the buffer memory 12 into DAT format according to another control signal of the controller 10. Namely, the DSP adds error correction code to the output data of the buffer memory 12 to increase the reliability of the data, and converts the data into the DAT format by interleaving. The converted data of the DSP 13 is delivered to the recording amplifier 15 and the memory 14. The data is amplified by the recording amplifier 15 and delivered to the rotational head 5. Thus the recording heads Wa and Wb of the rotational head 5 record the data on the magnetic tape. The rotational direction of the rotational head 5 in recording the data on the magnetic tape is opposite to that of the direction of the magnetic tape running.

The memory 14 stores the data according to the control signal W/R̄ of the controller 10 during a given time, so as to compare the stored data with the data recorded in the magnetic tape. The recording heads Wa and Wb and reproduction heads Ra and Rb of the rotational head 5 are symmetrically positioned at an angle of 180 degrees, wherein the recording head Wa is spaced from the reproduction head Ra by 90 degrees. The data recorded on the magnetic tape by the recording head Wa is reproduced and delivered to the reproduction amplifier 25 after a given time. Thus, the present invention employs four heads, of which two recording heads Wa and Wb record data that is immediately reproduced by two reproduction heads Ra and Rb to detect the data record errors.

Hereinafter, it will be described with reference to FIG. 2 how the recorded data is reproduced.

The direction of the data record is opposite to the direction of the magnetic tape running. In FIG. 2, the interval 2e indicates track pitch. The interval 2a indicates that the recording region of the recording head Wa is much greater than the track pitch 13.591 μm in the DAT format. This is caused by the fact that the size of the recording head Wa is greater than the track pitch. For example, assuming the recording region of the recording head Wa is one and half times the track pitch of the DAT format, the interval 2a recorded by the recording head Wa is reproduced by the reproduction head Ra before recording by the recording head Wb. Namely, the interval 2a is one and half times the track pitch, and therefore the reproduction head Ra reproduces the recorded data in the interval 2b even if the magnetic tape continues to move.

After the interval 2a is reproduced by the reproduction head Ra, the next data is recorded over the interval 2c by the record head Wb, wherein the real track pitch is 2e, satisfying the track pitch of the DAT format. Hence, the reproduced data delivered to the reproduction amplifier 25 is amplified and applied to the data strobe circuit 23. The data strobe circuit 23 puts the data into input codes so as to generate the distinction reproduction signals and data clock signals. The data clock signals are applied to the controller 10, and the distinction reproduction signals are applied to the first and second buffers 21 and 22.

In this case, the controller 10 generates the mode control signals REC/P̄L̄Ā̄Ȳ according to an internally provided program, so that the distinction reproduction signals are produced via the first buffer 21 if the data of an external system is recorded on the magnetic tape, while the data recorded on the magnetic tape is reproduced via the second buffer 22 to the DSP 13 if the data is transmitted to the external system. Thus, the mode control signals REC/P̄L̄Ā̄Ȳ are high for recording, in accordance with FIG. 1. The distinction reproduction signals of the data strobe circuit 23 are applied via the first buffer 21 to the comparing unit 20 to compare the distinction reproduction signals with the data stored in the memory 14 so as to generate the write data WOK indicating whether errors exist, with write data WOK being applied to the controller 10. In this case, assuming that the write data is high to indicate no data errors and low to indicate data errors, the controller 10 corrects the data errors recorded on the magnetic tape.

Figure 3:
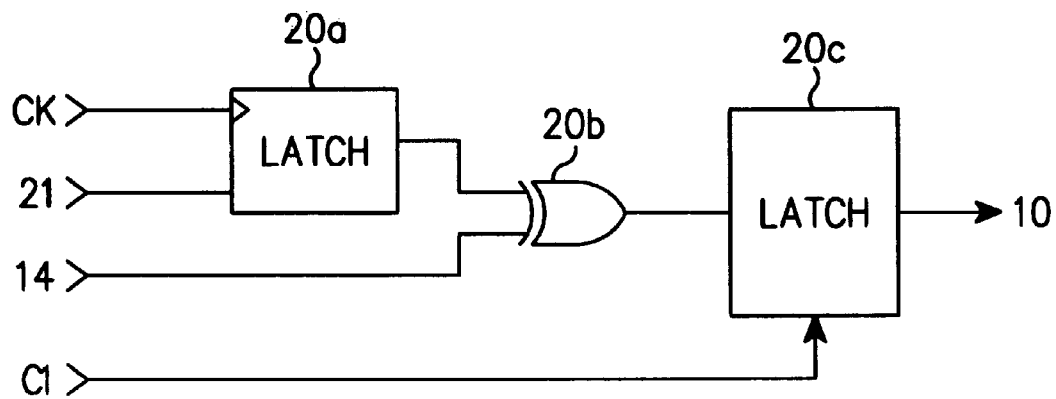
FIG. 3 is a specific embodiment of the comparing unit 20 in FIG. 1.

Referring to FIG. 3, the distinction reproduction signals and the clock signals CK of the controller 10 are delivered via the first buffer 21 to the first latch 20a. The comparator 20b is an exclusive-OR gate and compares the output of the first latch 20a and the output of the memory 14 so as to detect whether data errors exist on the magnetic tape. Thus the second latch 20c receives the output of the comparator 20b to latch the write data WOK, checking the errors delivered to the controller 10.

If data errors exist, the controller 10 reads the data stored in the buffer memory 12 so as to the data record again on the magnetic tape, as shown in FIGS. 4A to 4H.

FIG. 4A indicates the control signal W/R̄ of the controller delivered to the buffer memory 12, FIG. 4B the output of the buffer memory 12 wherein N indicates the frame, FIG. 4C the frame synchronization signal of FIG. 4B, and FIGS. 4D and 4E the data of the rotational head 5. Also, FIG. 4F indicates the control signal W/R̄ of the controller 10 delivered to the memory 14, FIG. 4G the inverted waveform of the clear signal C1 applied to the second latch 20c of the comparing unit 20, and FIG. 4H the waveform at the decision point of the controller 10.

If the comparing unit 20 detects an error, the controller 10 records data on the magnetic tape after two frames. Here, the waveform of FIG. 4G represents the clear signal that clears the second latch 20c of the comparing unit before comparing the next frame.

As stated above, the inventive data recording device records the data on the magnetic tape without errors.

While the invention has been particularly shown and described with reference to a preferred embodiment, it will be understood by those skilled in the art that modifications in detail may be made without departing from the spirit and scope of the invention.

What is claimed is:

1. A data recording and reproducing device for recording and reproducing electrical signals onto and from a magnetic tape by means of a rotational head, said device comprising:

input/output means for receiving first data from and transmitting second data to an external system;

first memory means for storing the first data received through said input/output means;

controller means connected to said first memory means, for controlling said device;

digital signal processing means connected to said controller means, for converting the first data received from said first memory means into converted data conforming to a digital audio tape recorder format;

second memory means connected to said digital signal processing means, for storing said converted data received from said digital signal processing means;

recording amplifier means connected to said digital signal processing means, for amplifying the converted data received from said digital signal processing means to generate amplified data, and transmitting said amplified data to said rotational head for recording on the magnetic tape;

data strobe means for receiving reproduced data from the magnetic tape and converting said reproduced data into a reproduction signal;

first and second buffer means commonly connected to said data strobe means for receiving said reproduction signal from said data strobe means during both a recording mode and a reproduction mode of said device, said first and second buffer means alternately enabling transmission of said reproduction signal based on operating modes of said device comprised of said recording mode and said reproduction mode, said first buffer means enabling transmission of said reproduction signal during said recording mode, said second buffer means enabling transmission of said reproduction signal to said external system as said second data during said reproduction mode; and comparing unit means connected to said first buffer means, for comparing said reproduction signal received from said first buffer means with said converted data stored in said second memory means during said recording mode of said device to detect data errors recorded on the magnetic tape;

said controller means correcting said data errors by sequentially enabling:
  transmission of said first data from said first memory means to said digital signal processing means for conversion of said first data into said converted data conforming to said digital audio tape recorder format,
  transmission of said converted data to said recording amplifier means for generation of said amplified data, and
  transmission of said amplified data to said rotational head for re-recording of said amplified data onto the magnetic tape.

2. The device as claimed in claim 1, wherein said comparing unit means comprises:
  first latch means for latching a clock signal from said controller means and said reproduction signal from said first buffer means, to generate a latched signal;
  comparator means connected to said first latch means, for comparing said latched signal and said converted data from said second memory means to generate a compared signal indicative of one of an existence and a nonexistence of said data errors; and
  second latch means connected to said comparator means to receive said compared signal, and transmit write data to said controller means in dependence upon a binary state of said compared signal.

3. A method of recording and reproducing electrical signals onto and from a magnetic tape in a data recording and reproducing device, said method comprising the steps of:
  receiving data from an external system;
  storing said data in a first memory;
  converting said data into a digital signal conforming to a digital audio tape recorder format;
  storing said digital signal in a second memory;
  amplifying said digital signal to generate an amplified digital signal, and transmitting said amplified digital signal to a rotational head for recording on the magnetic tape as recorded data;
  amplifying the recorded data reproduced from the magnetic tape by said rotational head and generating a reproduction signal;
  transmitting said reproduction signal to first and second buffers for storage irrespective of operating modes of said device comprised of a recording mode and a reproduction mode;
  transmitting said reproduction signal from said first buffer and comparing said reproduction signal with said digital signal stored in said second memory during said recording mode to determine an existence of data recording errors;
  transmitting said reproduction signal from said second buffer to said external system during said reproduction mode; and
  correcting the data recording errors recorded on said magnetic tape during said recording mode when said comparing step indicates the existence of data recording errors by sequentially:
    reading said data from said first memory,
    converting said data into said digital signal,
    amplifying said digital signal to generate said amplified digital signal, and re-recording said amplified digital signal onto the magnetic tape.

4. A data recording and reproducing apparatus for recording and reproducing electrical signals onto and from a magnetic tape and for correcting data errors recorded on the magnetic tape, said apparatus comprising:
  first memory means for storing data received from an external system;
  digital signal processing means connected to said first memory means, for converting said data into a digital signal conforming to a digital audio tape recorder format;
  second memory means for storing said digital signal;
  recording amplification means for amplifying said digital signal to generate a first amplified signal;
  recording/reproduction means for recording said first amplified signal onto the magnetic tape and generating reproduced data from the magnetic tape;
  reproduction amplification means for amplifying said reproduced data to generate a second amplified signal;
  data strobe means for converting said second amplified signal into a reproduction signal;
  first and second buffer means commonly connected to said data strobe means for receiving said reproduction signal from said data strobe means during both a recording mode and a reproduction mode of said apparatus, said first and second buffers selectively enabling transmission of said reproduction signal based on operating modes of said apparatus comprised of said recording mode and said reproduction mode, said second buffer enabling transmission of said reproduction signal during said recording mode, said second buffer means enabling transmission of said reproduction signal to said external system during said reproduction mode;
  comparing unit means for receiving said reproduction signal from said first buffer means and comparing said reproduction signal with said digital signal stored in said second memory means during said recording mode to detect data errors recorded on the magnetic tape; and
  controller means for correcting said data errors recorded on the magnetic tape when said reproduction signal and said digital signal stored in said second memory means do not correspond by sequentially enabling:
    transmission of said data from said first memory means to said digital signal processing means for conversion of said data into said digital signal conforming to said digital audio tape recorder format;
    amplification of said digital signal by said recording amplification means to generate said first amplified signal; and re-recording of said first amplified signal onto the magnetic tape by said recording/reproduction means.

5. The apparatus as claimed in claim 4, further comprised of said comparing unit means ceasing the comparison between said reproduction signal and said digital signal stored in said second memory during said reproduction mode of said apparatus.

6. The apparatus as claimed in claim 5, further comprised of said first amplified signal being re-recorded onto the magnetic tape two frames after said first amplified signal was originally recorded onto the magnetic tape.

7. The apparatus as claimed in claim 4, further comprised of said first memory means for transmitting said data to said digital signal processing means for conversion at substantially the same rate as said first amplified signal is recorded onto the magnetic tape.

8. The apparatus as claimed in claim 7, wherein said comparing unit means comprises:
   first latching means for latching a clock signal from said controlling means and said reproduction signal to generate a first latched signal;
   comparator means for comparing said first latched signal with said digital signal stored in said second memory means to generate an error detecting signal; and
   second latching means for latching said error detecting signal to generate a second latched signal for transmission to said controller means.

9. The apparatus as claimed in claim 5, further comprised of said first memory means for transmitting said data to said digital signal processing means for conversion at substantially the same rate as said first amplified signal is recorded onto the magnetic tape.

10. The apparatus as claimed in claim 9, wherein said comparing unit means comprises:
    first latching means for latching a clock signal from said controller means and said reproduction signal to generate a first latched signal;
    comparator means for comparing said first latched signal with said digital signal stored in said second memory means to generate an error detecting signal; and
    second latching means for latching said error detecting signal to generate a second latched signal for transmission to said controlling means, said second latched signal being indicative of one of an existence and a nonexistence of said data errors recorded on the magnetic tape.

11. The apparatus as claimed in claim 10, further comprising:
    input/output means for receiving said data from said external system prior to the storing of said data in said first memory means.

12. The apparatus as claimed in claim 11, further comprised of said first amplified signal being re-recorded onto the magnetic tape two frames after said first amplified signal was originally recorded onto the magnetic tape.

13. The apparatus as claimed in claim 11, wherein said recording/reproduction means comprises:
    first and second recording head means for recording said first amplified signal onto the magnetic tape, said first recording head means being spaced apart from said second recording head means by 180 degrees; and
    first and second reproduction head means for generating said reproduced data from the magnetic tape, said first reproduction head means being spaced apart from said second reproduction head means by 180 degrees, said first and second recording head means being spaced 90 degrees apart from said first and second reproduction head means, respectively.

14. The apparatus as claimed in claim 11, wherein said first memory means transmits said data to said digital signal processing means for conversion at substantially the same rate as said first amplified signal is recorded onto the magnetic tape.

15. The apparatus as claimed in claim 10, wherein said second latching means is cleared by said controller means before a next comparison between said first latched signal and said digital signal during a next frame.

16. The apparatus as claimed in claim 4, wherein said digital signal processing means adds error correction code to said data during conversion of said data into said digital signal.

17. A method of recording and reproducing electrical signals onto and from a magnetic tape in a data recording and reproducing device, said method comprising the steps of:
    receiving data from an external system;
    storing said data in a first memory;
    transmitting said data from said first memory to a digital signal processor;
    converting said data to digital data via said digital signal processor;
    storing said digital data in a second memory;
    recording said digital data onto the magnetic tape and thereafter reproducing said digital data from the magnetic tape;
    converting said digital data into a reproduction signal;
    transmitting said reproduction signal to first and second buffers for storage irrespective of operating modes of said device comprised of a recording mode and a reproduction mode;
    transmitting said reproduction signal from said first buffer and making a comparison between said reproduction signal and said digital data stored in said second memory during said recording mode to detect data errors recorded on the magnetic tape;
    transmitting said reproduction signal from said second buffer to said external system during said reproduction mode; and
    correcting said data errors detected on the magnetic tape during said recording mode by sequentially:
      reading said data from said first memory,
      converting said data into said digital data,
      amplifying said digital data, and
      re-recording said digital data onto said magnetic tape.

18. The method as claimed in claim 17, further comprised of ceasing said comparison between said reproduction signal and said digital data stored in said second memory during said reproduction mode of said device.

19. The method as claimed in claim 18, further comprising:
    transmitting said data from said first memory to said digital signal processor for conversion at substantially the same rate as recording said digital data onto the magnetic tape.

20. The method as claimed in claim 17, wherein said comparison between said distinguishing reproduction signal and said digital data comprises the steps of:
    latching said reproduction signal and a clock signal to generate a latched signal;
    comparing said latched signal with said digital data to generate an error detection signal;

latching said error detection signal to generate an error correction signal; and clearing said error correction signal before making another comparison between said reproduction signal and said digital data.

21. The method as claimed in claim 1, further comprised of said rerecording of said digital data onto the magnetic tape occurring two frames after said digital data was originally recorded onto the magnetic tape.

22. The method as claimed in claim 20, further comprised of ceasing said comparison between said reproduction signal and said digital data stored in said second memory during said reproduction mode of said device.

23. The apparatus as claimed in claim 13, wherein a recording region of each of said first and second recording head means is greater than a track pitch of the magnetic tape.

24. The apparatus as claimed in claim 13, wherein said first reproduction head means begins generation of said reproduced data from the magnetic tape before said second recording head means begins recording said amplified signal onto the magnetic tape.

25. The apparatus as claimed in claim 23, wherein said first reproduction head means begins generation of said reproduced data from said magnetic tape before said second recording head means begins recording said amplified signal onto the magnetic tape.

26. The device as claimed in claim 1, further comprised of said comparing unit means for ceasing the comparison between said reproduction signal and said converted data during said reproduction mode of said device.

27. The device as claimed in claim 1, further comprised of the re-recording of said amplified data onto the magnetic tape occurring two frames after said amplified data is originally recorded onto the magnetic tape.

28. The method as claimed in claim 3, further comprised of said step of comparing said reproduction signal with said digital signal stored in said second memory ceasing during said reproduction mode of said device.

29. The method as claimed in claim 3, further comprised of said step of re-recording said amplified digital signal onto the magnetic tape occurring two frames after said amplified digital signal is originally recorded onto the magnetic tape.

\* \* \* \* \*